Jan. 22, 1924.

T. DOOTSON

DEMOUNTABLE RIM

Filed Sept. 19, 1922

1,481,695

Inventor
Thomas Dootson,

By
Attorney

Patented Jan. 22, 1924.

1,481,695

UNITED STATES PATENT OFFICE.

THOMAS DOOTSON, OF EVERETT, WASHINGTON.

DEMOUNTABLE RIM.

Application filed September 19, 1922. Serial No. 589,170.

*To all whom it may concern:*

Be it known that THOMAS DOOTSON, a citizen of the United States of America, residing at Everett, in the county of Snohomish and State of Washington, has invented new and useful Improvements in Demountable Rims, of which the following is a specification.

The object of the invention is to provide a demountable wheel or tire rim with a detachable flange to facilitate the positioning of the tire thereon without detracting from the convenience of applying and removing the rim when the tire is in place thereon, and otherwise to simplify the construction of demountable rims and effect an economy in the manufacturing cost thereof; and with these objects in view the invention consists in a construction and combination of parts of which a preferred embodiment is shown in the accompanying drawings, wherein:—

Figure 1 is an edge view of a demountable rim embodying the invention.

Figures 2 and 3 are transverse sections on the planes respectively indicated by the lines 2—2 and 3—3 of Figure 1.

Figure 1:
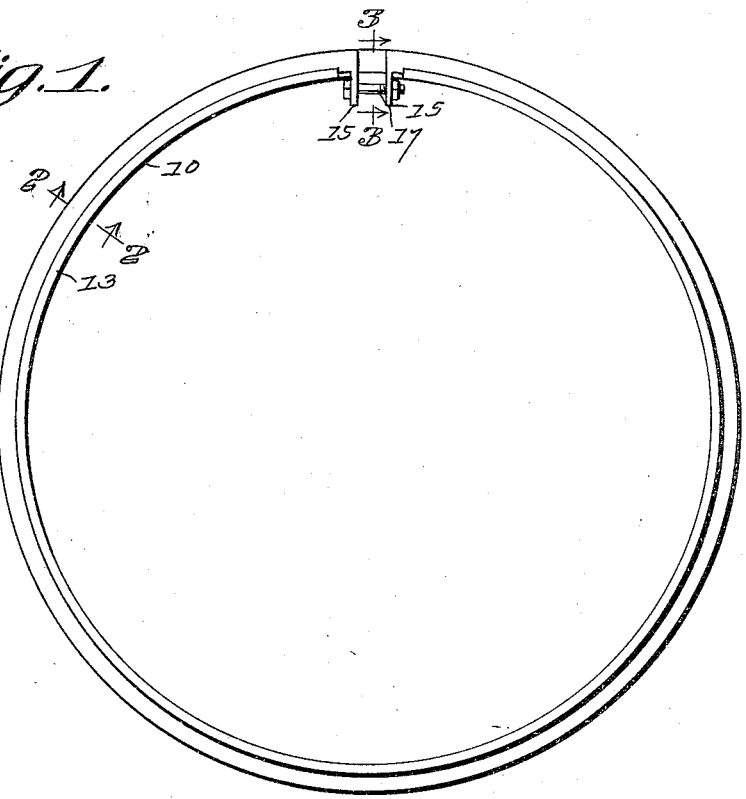
Figure 2:
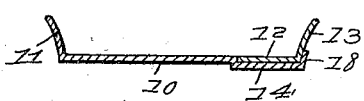
Figure 4:
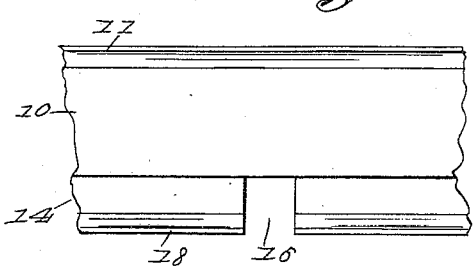
Figure 4 is an enlarged plan view of a portion of the main band.
Figure 3:
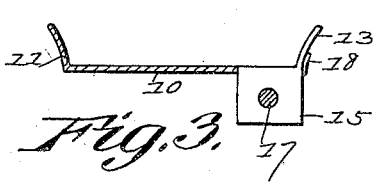
Figure 5:
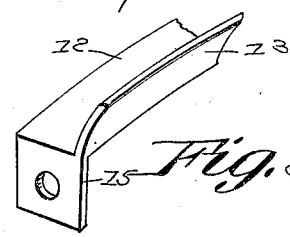
Figure 5 is a detail view in perspective of one end of a detachable band.

The rim consists essentially of a main band 10 carrying a detachable flange 13, the flanges 11 and 13 being complemental in operation for contact with opposite edges of a tire seated on the rim, and while these flanges may be of any preferred contour they are preferably of the flaring type indicated in the drawing to adapt them for use in connection with any of the commercial forms of tires.

The main band is continuous with a channel 14 formed therein adjacent to that edge which is opposite to the fixed flange 11 for the reception of the detachable band 12 which is of the split type and therefore is of expansible and contractible construction. The free ends of the detachable or split band carry inwardly directed ears 15 occupying a position in a recess 16 formed by cutting away a segment of the channeled edge portion of the main band, and while this detachable or split band may readily be fitted over the unflanged edge of the main band and seated in the channel formed in said main band, the contraction of the split band through the agency of a bolt 17 serves to draw the split band firmly into the channel of the main band and lock the former to the latter and hence afford a substantial anchorage for the detachable flange 13 which thus cooperates effectively with the fixed flange 11.

As a further means of security for the detachable or split band the channel 14 is preferably bounded at its outer edge by a slight upwardly or outwardly turned lip 18 over which the split band may readily be passed to effect the seating thereof in the channel, and said lip constitutes a positive means for preventing the outward displacement of the detachable or split band when the latter has been contracted by the adjustment of the bolt 17.

Thus while the members of the rim which respectively carry the tire engaging flanges may readily be disconnected to facilitate the removal or mounting of a tire, the release of the detachable or split member being effected merely by loosening the bolt 17, the detachable flange may readily be replaced after the tire has been positioned on the main member of the rim and may be firmly locked by the contraction of the detachable or split band to afford a rigidity and strength of the detachable flange which is equal with that of the fixed flange in the matter of holding the tire in place.

Having described the invention, what is claimed as new and useful is:—

A demountable tire rim comprising a continuous band provided at one of its side edges with a depressed channel having a recess which spaces the ends of the channel from each other, the continuous band having at one edge a continuous flange, the channel portion having at its outer edge an upturned lip which extends the full length of the channel portion and which terminates at its ends at the opposite side edges of the recess, a detachable band adapted to fit snugly in the depressed channel and completely filling the same, said detachable band being split transversely and having inwardly disposed ears which extend through the recess, the outer surfaces of the ears being flush with the extremities of the ends of the split band and a draw bolt passing transversely through the ears and adapted to draw the inner surfaces of the ears in close contact with each other whereby the ends of the split band may be brought in contact with each other.

In testimony whereof he affixes his signature.

THOMAS DOOTSON.